United States Patent
Ficner

(10) Patent No.: US 10,437,201 B1
(45) Date of Patent: Oct. 8, 2019

(54) COMPENSATED ACTUATOR SYSTEM

(71) Applicant: Honeywell International Inc., Morris Plains, NJ (US)

(72) Inventor: Ondrej Ficner, Bucovice (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/944,181

(22) Filed: Apr. 30, 2018

(51) Int. Cl.
*G05B 5/01* (2006.01)
*H02P 31/00* (2006.01)

(52) U.S. Cl.
CPC .............. *G05B 5/01* (2013.01); *H02P 31/00* (2013.01)

(58) Field of Classification Search
CPC .................................. H02P 31/00; G05B 5/01
USPC .................................................. 318/448, 445
See application file for complete search history.

(56) References Cited

U.S. PATENT DOCUMENTS

| | | | |
|---|---|---|---|
| 6,459,855 B1 * | 10/2002 | Kosaka | G03B 9/08 396/176 |
| 7,683,595 B2 | 3/2010 | Feldtkeller et al. | |
| 8,405,939 B2 | 3/2013 | Haines et al. | |
| 8,573,241 B2 | 11/2013 | Esposito | |
| 8,706,305 B2 * | 4/2014 | Jiang | F03G 7/065 700/275 |
| 8,810,157 B2 * | 8/2014 | Del Carmen, Jr. | H02M 3/158 315/297 |

OTHER PUBLICATIONS

Elayath et al., "High Power Factor Bridgeless Buck Converter Based Isolated Supply for Led," IOSR Journal of Electrical and Electronics Engineering, pp. 50-59, 2016.
Circuit Tradeoffs Minimize Noise in Battery-Input Power Supplies, Maxim Integrated Products, Inc., 9 pages, Nov. 28, 2017.
"Fundamentals of Electric Actuator Control: A View of the Electrical Functions of a Motor Actuator," Valve Magazine, 8 pages, 2006.

* cited by examiner

*Primary Examiner* — David Luo
(74) *Attorney, Agent, or Firm* — Seager, Tufte & Wickhem LLP

(57) ABSTRACT

An actuator system designed to avoid load position hunting. The system may eliminate a voltage drop of resistance of connecting wires between a load (e.g., a motor) and a power source, by removing current flow through the wires. A command source may provide a command voltage for controlling the load relative to a ground at the power source. However, the voltage may be different relative to a ground at the load. A switch may break a connection between the power source and the load, thus removing the potential difference between the grounds. After the command voltage is entered at the load, the switch may remove the break of the connection between the power source and the load. During the break, a power storage module, such as a capacitor, may provide a current flow to the load. The power storage module may be replenished with current when the break is removed.

17 Claims, 5 Drawing Sheets

COMPENSATED ACTUATOR SYSTEM

BACKGROUND

The present disclosure pertains to actuators and controls of actuators.

SUMMARY

The disclosure concerns an issue of actuator hunting and a solution to eliminate such hunting. The solution may eliminate an effect of wire resistance between a load (e.g., a motor) and a power source. A technique may remove current flow through the wires between the power source and the load. A command source may provide a control voltage to the load relative to a common ground at the power source. The load may have a different voltage at its ground than the common ground of the power source, due to resistance of the wires between the power supply and the load, and due to the current flow. A switch may break a connection between the power source and the load thus removing the current flow and eliminating the resulting potential difference between the grounds at the power source and at the load, so that when the control voltage is presented to the load, the control voltages are the same at the power source and the load relative to their respective grounds. After the control voltage is accepted and effected at the load, the switch may remove the break of the connection between the power source and the load and let the current flow again. However, during the break, a power storage module, such as a capacitor, may provide and continue the current flow to the load. The power storage module may be replenished with current from the power source when the break is removed.

DESCRIPTION

Figure 1:
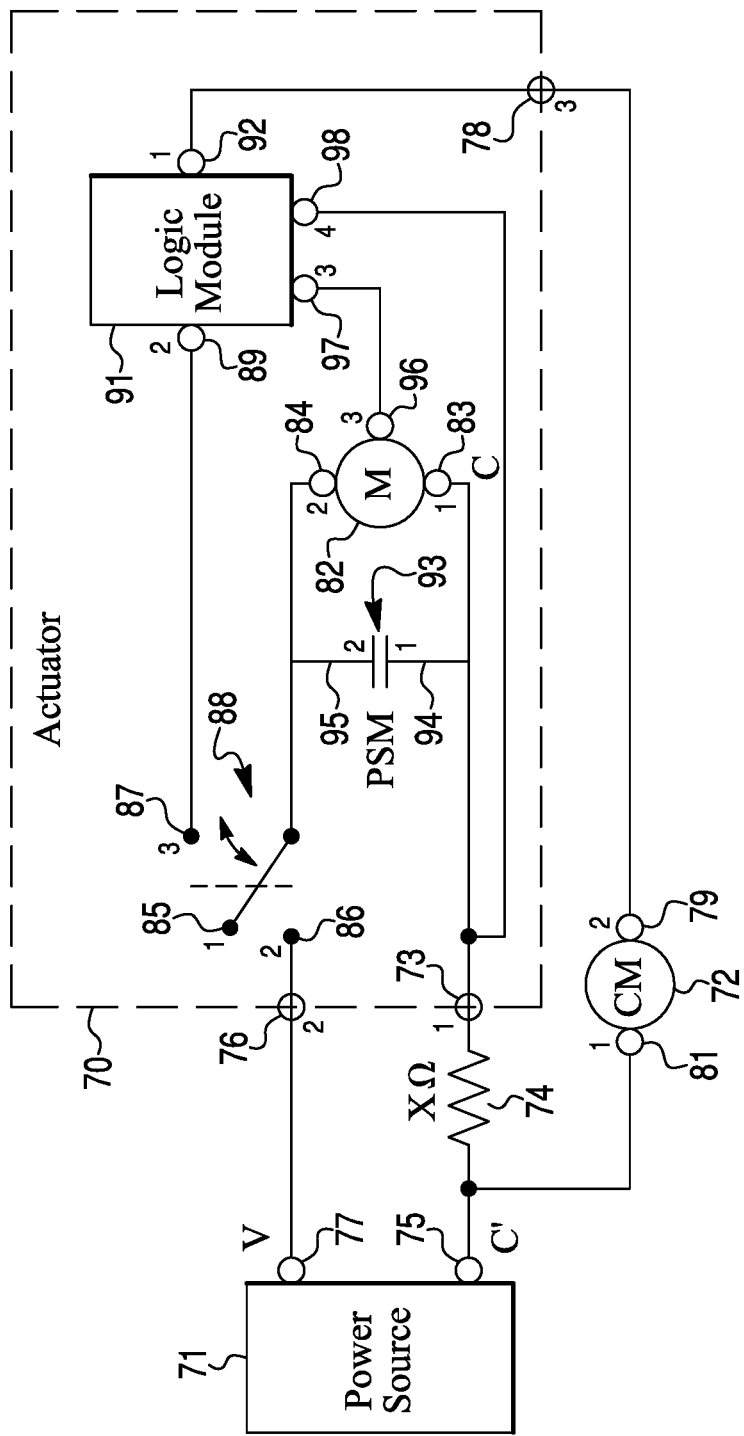
FIG. 1 is a diagram of an actuator, power source and a command module.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Actuators may be controlled by a modulating signal which is DC voltage that can be varied. Many common voltage ranges may incorporate controlling with 0 to 10 VDC and 2 to 10 VDC, which represent commands for actuators from 0 to full stroke (often 90 degrees of rotation).

An issue is that a control signal may be referenced against a common signal ground, which can often be represented by a common wire from a controller. The common signal ground may be used as a reference across the control system. The same common wire may also be used for power distribution from a transformer or a DC voltage source. The wire itself may have a real resistance and power/current flowing through the wire thus causing voltage shift (ohms law). That may change the reference ground and cause an error on a commanded signal (i.e., a function of current and wire resistance).

An actuator may be a device that consumes a higher current when moving a load and a lower current when holding the load in a position. That may cause changes in current and changes in the reference ground due to the current and wire resistance. An actuator may read the position in a holding state and realize that the command has changed and that the actuator needs to move with the output. Once the actuator starts movement, the current may be increased, which can lead to a reference ground change and a command (modulating) signal reading change on the actuator side. So the actuator may start a movement to a new commanded position based on a command from a moving state. Once the actuator reaches a commanded position, the current may drop down, the reference ground may be changed back, and then this change may be realized as a new command. That may lead to a movement back and forth all the time, and the movement may be called "actuator hunting". Actuator hunting may cause increased power consumption, increased audible noise levels, and more wear of the actuator.

One approach for removing hunting might be to design an actuator with a wide insensitivity range/hysteresis and to install low resistance wires. That approach may decrease performance of the actuator (accuracy, resolution, and so on) and increase installation costs of the actuator.

A solution may read the commanded signal in no current flow states only which removes a negative impact of real resistance of wires. The solution may enable the product to be more sensitive and accurate, and remove hunting. Power consumption may be decreased, audible noise may be lower, and a lifetime of the product may be longer by removing the hunting. Usage of this approach may cost nothing in case it is used together with a micro-controlled PFC (power factor corrector), DC-DC converter or anything with an ON/OFF switch function in the power supply.

The solution idea may be based on ohms law and real resistance of common wires which causes an error in reading of DC voltages (modulating signal in an actuator's case). To remove the error, it may be necessary to remove one or both parameters which cause an error in reading. Wire resistance may be part of installation and design cannot necessarily influence the resistance directly (i.e., just by a literature guide).

An option may be to influence the current control. That may be possible if a switch on the power line is in the design. By switching off the switch, the current stops flowing and error caused by wire resistance in combination with current, may disappear. Wire resistance may, for example, range from 0.001 to 0.1 ohm per foot. The modulating signal should be measured just when the current is not flowing and no error is caused by it.

The design should be ready for such situation when the switch is OFF to be still capable of work from stored energy (e.g., capacitors). Also, the switch itself should be fast enough to reduce OFF time to minimum so that capacitor size is not extremely large (i.e., expensive). A speed of the switch may be less than one millisecond.

The present approach may have a software component. A stack level may have a sensor—such as a hardware device with some embedded software measuring/detecting and transmitting data (e.g., temperature, pressure, motion). The software may run in a device/unit (e.g., firmware).

FIG. 1 is a diagram of an actuator 70, power source 71 and a command module 72.

Actuator 70 may have a first terminal 73 connected, via a wire 74 having X ohms of resistance, to a common ground first terminal 75 (C') of power source 71. Actuator 70 may have a second terminal 76 connected to a hot terminal 77 of power source 71. Actuator 70 may also have a third terminal 78 connected to a first terminal 79 of command module 72. A second terminal 81 of command module 72 may be connected to common ground terminal 75 of power source 71.

Actuator 70 may have a motor 82 with a first terminal 83 connected via terminal 73 and wire 74 to common ground terminal 75 of power source 71. Motor 82 may have a second terminal 84 connected to terminal 76 via a first terminal 85 and second terminal 86 of switch 88 that may be closed via terminals 85 and 86 or opened via terminal 85 separated from terminal 86. A third terminal 87 of switch 88 may be a solenoid for operating switch 88 and is connected to a second terminal 89 of logic module 91 for controlling switch 88 by logic module 91. A first terminal 92 of logic module 91 may receive a command voltage from a first terminal 79 of command module 72, through a second terminal 81 of command module 72 from common ground terminal 75 of power source 71, to rotate motor 82 a certain amount according to a magnitude of the command voltage relative to common ground terminal 75, at first terminal 83 at motor 84. A power storage module 93 may have a first terminal 94 connected to first terminal 83 of motor 82 and a second terminal 95 connected to second terminal 84 of motor 82.

When the command voltage is sent from first terminal 79 of command module 72 to first terminal 92 of logic module 91, a logic signal from the logic module 91, in turn, a switch signal goes from second terminal 89 of logic module 91 to third terminal 87 of switch 88 to open switch 88, thereby reducing the current to zero through first wire 74 having X ohms of resistance, and the command voltage is provided to first terminal 92 of logic module 91, and power storage module 93 provides power from first terminal 94 and second terminal 95 to first terminal 83 and second terminal of motor 82 while switch 88 is open.

Upon receipt of the command voltage to third terminal 96 of motor 82 from a third terminal 97 of logic module 91, switch 88 may be closed with the logic signal from second terminal 89 of logic module 91 to third terminal of 87 of switch 88, and thus current may flow from hot or voltage terminal 77 to terminal 75 of power source 71 via closed switch 88, second terminal 84 of motor 88, through motor 88, and from first terminal 83 of motor 88, through terminal 73 and wire 74 to common ground terminal 75 of power source 71. Some of the current through switch 88 may flow to second terminal 95 of power storage module 93 to replenish lost power. Fourth terminal 98 of logic module 91 may be connected to terminal 73 of actuator 70, which may indicate a common ground potential at first terminal 83 of motor 82.

Figure 2:
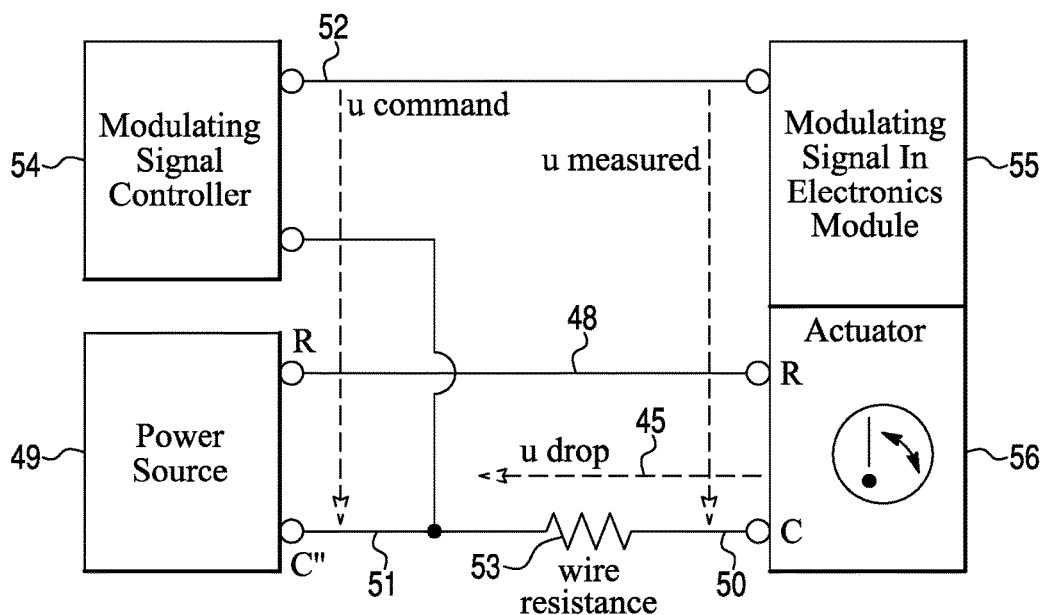
FIG. 2 is a diagram that can illustrate a situation which may create unwanted behavior of hunting of an actuator.

FIG. 2 is a diagram that can illustrate a situation which may create unwanted behavior of hunting of an actuator 55. Goal of the diagram is to show that the same common wire 50-51 may be used for power supply as well as for a signal reference of actuator command signals on line 52. Common wire 50-51 may have some existing resistance 53 in that it can show a voltage drop 45 on the common wire itself due to it resistance 53 causing a change in a measured command signal on line 52 that is unwanted.

For example, a command signal from controller 54 may be 10 VDC and voltage drop 45 can be 0V when actuator 55 holds a position of an output hub 56, and 1 VDC when actuator 55 moves output hub 56 and consumes current via common wire or line 50-51. That current consumption may cause different reading or measurement of the command signal at the actuator. There may be 10 VDC in the holding mode and 10−1=9 VDC in the driving mode of actuator 55. That difference may be big enough to change movement of output hub 56 to a different position. Actuator may go in to a holding mode once output hub 56 reaches the position for a most recent reading or measurement of the command signal at actuator 55. Read or measured command signal may then go back to the level when sent from controller (10V) and the next measurement or level of the command signal would cause start of a movement of output hub 56 by actuator 55 again from reading a different command signal at actuator 55.

Figure 3:
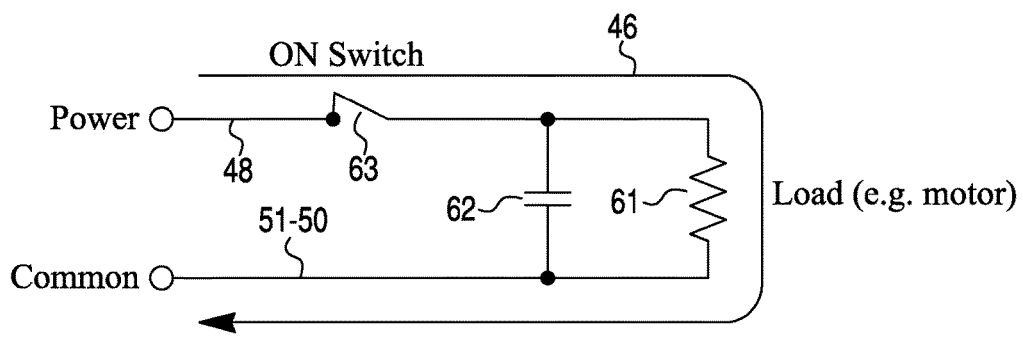
FIG. 3 and FIG. 4 are diagrams that reveal a capacitor and switch arrangement that may be situated in an actuator enclosure.
Figure 4:
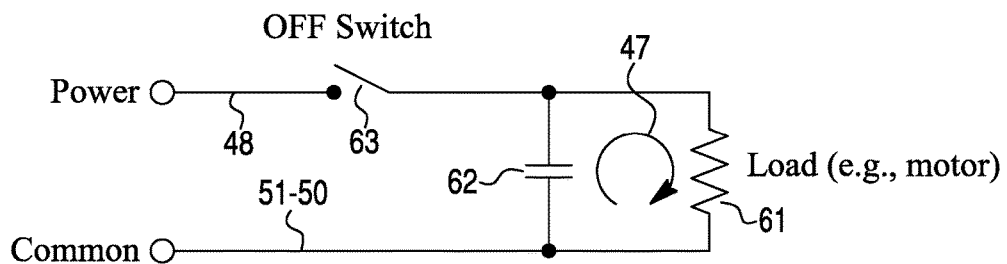

Diagrams of FIG. 3 and FIG. 4 reveal a capacitor 62 and a switch 63 that may be situated in actuator 55 of FIG. 2. "U" in the diagram of FIG. 2 may represent a modulating command signal going out of a controller 54 which is a DC voltage in a range from 0 to 10 VDC. "Umeasured" in the diagram of FIG. 2 may represent a modulating signal at actuator 55. "C" may represent a reference (common) ground 50 for the command signal at actuator 55 and "C'" may represent a reference (common) ground 51 for the command signal at controller 54. Also, "Udrop" in the diagram of FIG. 2 may represent a voltage drop 45 across resistance 53 of common wire 50-51.

Timing characteristics may be noted for the diagrams of FIG. 3 and FIG. 4. The situation represented by FIG. 3 may apply to 99 percent of the time of the command signals and the actuator 55. Actuator 55 may be powered by power source 49, for example, 24 VDC applied from power source 49 (+/R) along line 48 and reference (common) ground 51-50 (GND/C) along the wire with resistance 53. Switch 63 may be turned ON (closed). A current 46 may go through switch 63 and bypass a capacitor 62 because it is charged to the same potential of power source 49. Current 46 may then go directly to a load 61 (e.g., control logic and motor). No modulating command signal from controller 54 is necessarily being measured during the period of current 46 going directly to load 61.

The situation represented by FIG. 4 may apply to 0.9 percent of the time of the command signals and the actuator 55. Switch 63 may be OFF (open) and thus no current can necessarily flow through switch 63. A current 47 needed for load 61 (e.g., control logic+motor) may be supplied from capacitor 62 which has sufficient capacity to provide current 47 to load 61 for the period of time needed for measurements. The modulating command signal on line 52 of FIG. 2 may be measured during the period of time; that is, no current going through reference (common) ground 50-51 with wire resistance 53 would result in no voltage drop 45 so as to remove an incorrect wrong measurement of the DC voltage on the command signal.

Figure 5:
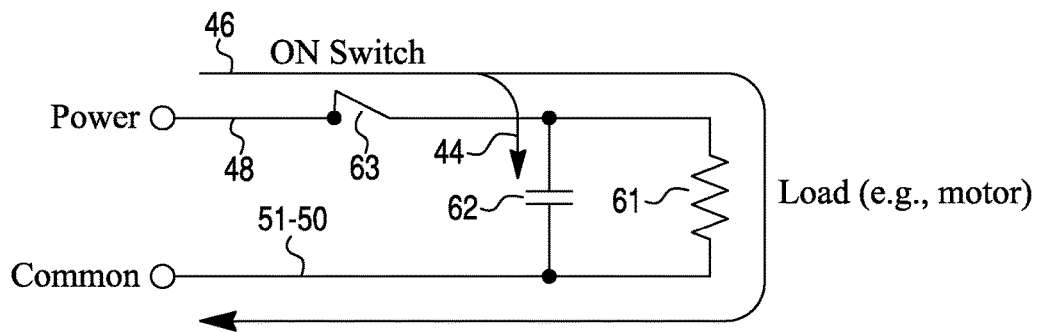
FIG. 5 is a diagram where current from a power source breaks off as a part of current to flow to a capacitor to charge it up to a potential of the power source.

Another 0.1 percent of the time may apply to another situation similar to that in FIG. 3, but different as shown in a diagram of FIG. 5, where actuator 55 may be powered from power source 49, for example, 24 VDC applied from power source 49 (+/R) along line 48 and reference (common) ground 51-50 (GND/C) along the wire with resistance 53 and switch 63 may be turned ON (closed), where a current 44 breaks off as a part of current 46 to flow to capacitor 62 to charge it up back to the potential of DC power source 49. No modulating command signal on line 52 at actuator 55 is necessarily being measured during this 0.1 percent period of the time.

Figure 6A:
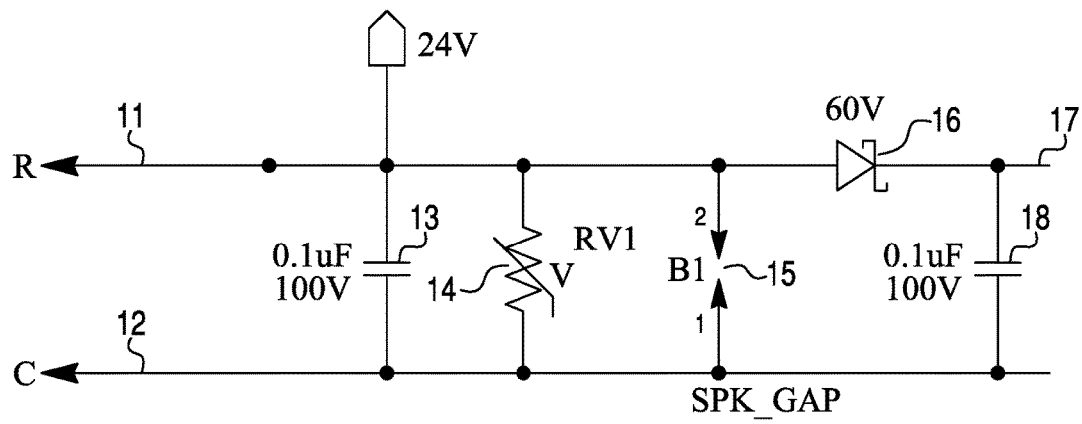
FIGS. 6A, 6B and 6C are diagrams of an illustrative circuit implementation of an actuator system.
Figure 6B:
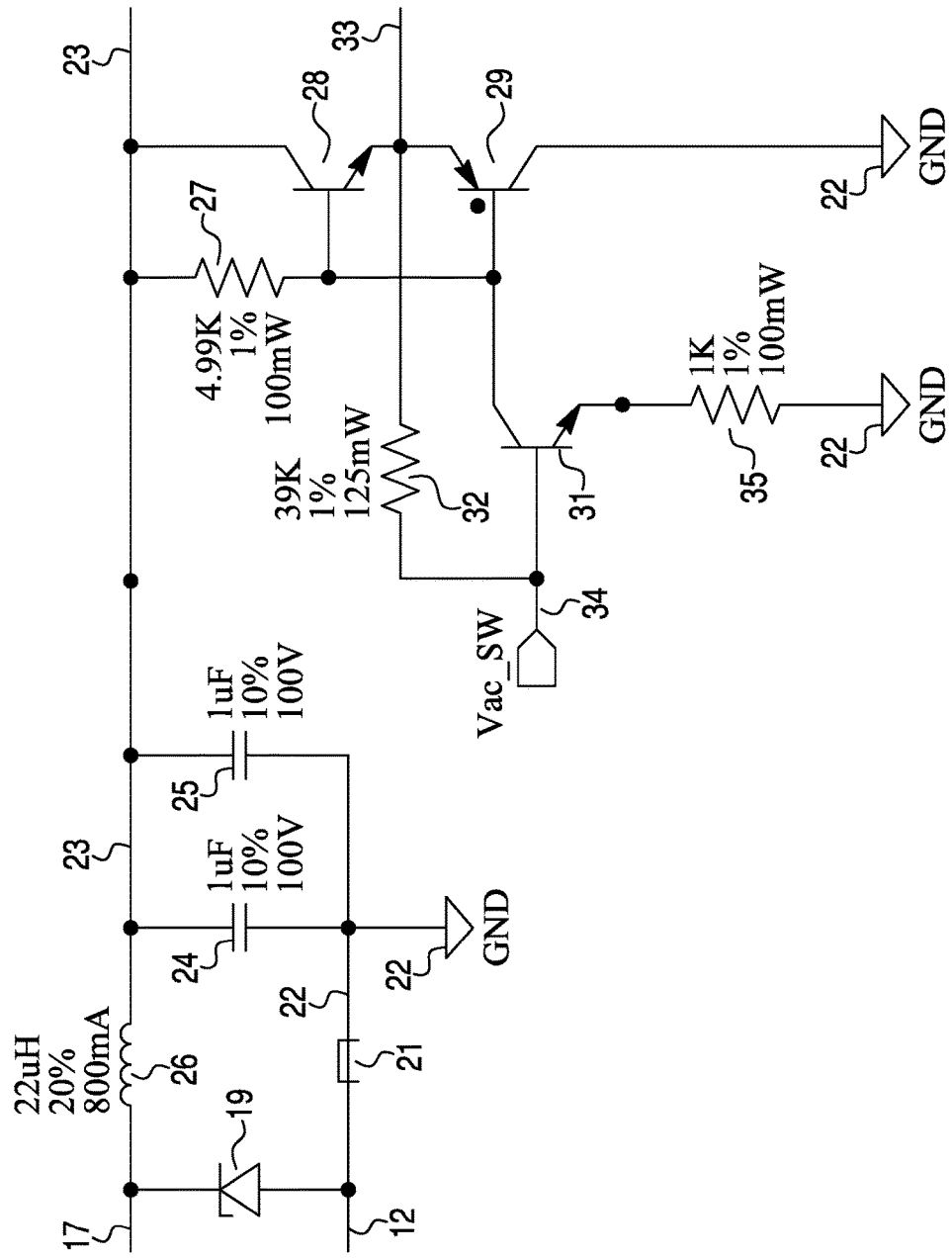
Figure 6C:
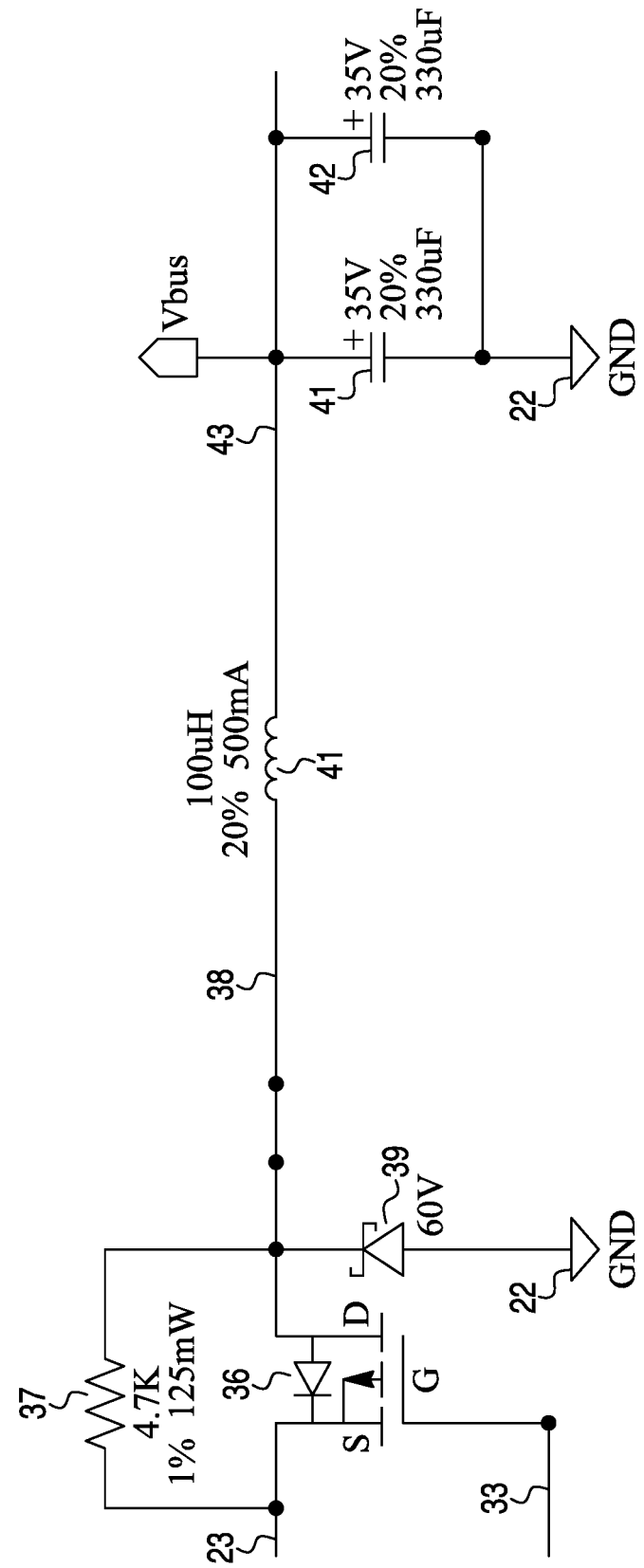

FIGS. 6A, 6B and 6C are diagrams of a circuit implementation of the present system. Power may be provided from terminals R and C and lines 11 and 12, respectively. Line 12 may be a common reference.

Specific values of components may be provided in the description; however, other values may be used. A voltage across terminals R and C may be 24 volts. For filtering and removal of spikes may be a capacitor 13 of 0.1 microfarad, a varistor 14 and a spark gap 15. There may be a 60 volt zener diode 16 having an anode connected to line 11 and a cathode connected to a line 17. A capacitor 18 of 0.1 microfarad may be connected across lines 17 and 12. A zener diode 19 may have a cathode connected to line 17 and an anode connected to line 12.

Lines 17 and 12 are shown to continue from FIG. 6A into FIG. 6B. A fuse 21 may have one end connected to line 12 and another end connected to a line or ground 22. A 22 micro-henry inductor 16 may have one end connected to line 17 and another end connected to a line 23 that may referred to buck-in. Two one microfarad capacitors 24 and 25 may be connected across line 22 and line 23.

A 4.99 K-ohm resistor 27 may have one end connected to line 23 and another end connected to a base of a NPN transistor 28, to a base of a PNP transistor 29, and to a collector of an NPN transistor 31. A 39 K-ohm resistor 32 may have one end connected to a line 33 and another end connected to a base of transistor 31 and to a terminal or line 34. Line 33 may be connected to the emitters of transistors 28 and 29. A collector of transistor 28 may be connected to line 23. A collector of transistor 29 may be connected to ground 22. A one K-ohm resistor 35 may have one end connected to an emitter of transistor 31 and another end connected to ground 22.

Lines 23 and 33 are shown to continue from FIG. 6B to FIG. 6C. Line 23 may be connected to a source of a P-channel FET 36. Line 33 may be connected to a gate of FET 36. A 4.7 K-ohm resistor 37 may have one end connected to the source of FET 36 and another end connected to a drain of FET 36 and to a line 38 that may have a Vac-SW terminal. A zener diode 39 may have a cathode connected to line 38 and an anode connected to ground 22. FET 36, zener diode 39 and resistor 37 may make up a switch.

A 100 micro-henry inductor 41 may have one end connected to line 38 and another end connected to a line 42 that may be connected to a Vbus terminal. There may be two 330 microfarad capacitors 41 and 42 connected in parallel across line 42 and ground 22.

The real resistance of the wire X may be unwanted but existing parameter in the system and outside of the actuator. Current flowing through it creates the voltage drop by Ohm's law on that wire (Vdrop=I×Rx). That voltage influences the reference common terminal of the actuator. Therefore actuator reads different value compared to what command module sent.

The current flows just in case motor (or any other bigger load) is ON. So once the motor moves, the current is being increased, voltage drop across the wire is being increased and actuator (logic module) reads different command (command=command voltage−voltage drop of the wire). Therefore logic module decides to drive motor to different commanded position. Once it reaches the position, a motor is switched OFF, current is being decreased, and voltage drop is being decreased as well. That leads to change of reference signal C on actuator again, new signal is being recognized by logic module and motor is being turned ON again, current is being increased again. So that may be a bad state of hunting when actuator is moving back and forth even command signal is constant and its meaning is to stay at the position.

An idea may be to measure the command signal when no current flows into actuator; therefore, no voltage drop is on the wire. Thus reference signal of power supply is identical as reference terminal of the actuator and command signal is being read correctly independently on state of the motor (ON or OFF).

The switch may take care of creating no current flow state for short period of time. A goal is to compensate real resistance of wiring outside the actuator/device. A command module outside actuator may control just a position of the actuator. It is typically DC voltage with 2 terminals only.

Hunting compensation may be done inside an actuator by its logic. The logic may also read the commanded signal and take care of driving the motor towards its expected position.

To recap, a compensated actuator circuit may incorporate a power source; an actuator having a first terminal connected, via a first wire having X ohms of resistance, to a common ground terminal of the power source, and having a second terminal connected via a second wire to a voltage terminal of the power source; and a command module having a first terminal connected to the common ground terminal of the power source and having a second terminal connected to a third terminal of the actuator.

X may be a number or an integer.

The actuator may incorporate a motor having a first terminal connected to the first terminal of the actuator; a switch having a first terminal connected to a second terminal of the motor, a second terminal connected to the second terminal of the actuator, and having a third terminal for controlling a closing and opening of the first and the second terminals of the switch; a logic module having a first terminal connected to the third terminal of the actuator, a second terminal connected to the third terminal of the switch, a third terminal connected to a third terminal of the motor for controlling the motor, and a fourth terminal connected to the first terminal of the actuator; and a power storage module having first terminal connected to the first terminal of the motor and a second terminal connected to the second terminal of the motor.

The switch may be opened or closed according to a signal from the second terminal of the logic module to the third terminal of the switch, to connect or disconnect the second terminal of the motor and the second terminal of the power storage module via the third terminal of the actuator to or from, respectively, the voltage terminal of the power source.

The first terminal of the logic module may receive a command voltage, via the third terminal of the actuator and the first and second terminals of the command module, from the common ground terminal, to rotate the motor a certain amount according to a magnitude of the command voltage, relative to the common ground terminal, at the first terminal of the motor.

When the command voltage is to be sent from the second terminal of the command module to the first terminal of the logic module, a signal from the second terminal of the logic module may go to the third terminal of the switch and open the switch, thereby reducing the current to zero through the first wire having the X ohms of resistance, and then a command voltage may be provided to the first terminal of the logic module, and the power storage module may provide power from the first and second terminals to the first and second terminals, respectively, of the motor while the switch is open.

Upon receipt of the command voltage to the third terminal of the motor that determines the amount of rotation of the motor, the switch may be closed with the signal from the second terminal of the logic module to the third terminal of the switch, and current may flow from the power source to the first and second terminals of the motor and to the power storage module to replenish lost power.

The wire resistance may range from 0.001 ohm to 0.1 ohm per foot and the length of the first wire may range from 0.1 inch to 100 feet.

The command module may provide a modulating DC voltage at the second terminal for control of the motor.

A approach for control of an actuator motor may incorporate connecting a first terminal of a motor to a resistive wire for connection to a common ground terminal of a power supply, connecting a second terminal of the motor via a switch to a voltage terminal of the power supply, connecting a first terminal of a command module to the common ground terminal, connecting a second terminal of the command module to a control terminal of the motor, connecting a power storage module across the first and second terminals of the motor, opening the switch when a command voltage is provided to the control terminal of the motor, and closing the switch after the command voltage is provided to the motor.

While the switch is open, the motor may continue to be energized with current from the power storage module. When the switch is closed, the power storage module may be recharged with some current drawn from current going to the motor.

The wire may have a resistance value which has a voltage drop when current is flowing through the wire to the motor.

Opening the switch may stop current flow through the resistive wire and eliminate the voltage drop. The command voltage at the control terminal to the motor may be unaffected by the voltage drop in the wire.

The approach may further incorporate a logic module connected between the command module and the control terminal of the motor, and connected to a control terminal of the switch.

The logic module may be further connected to the first terminal of the motor. The logic module may detect an amount voltage drop through the resistive wire.

If the command module provides a command voltage for the motor, the logic module may send a signal to the control terminal of the switch to open the switch to stop current flow from the power supply and eliminate the voltage drop through the resistive wire, and current may continue to flow to the motor from the power storage module.

An actuator system may incorporate an actuator having a first terminal connected to one end of a wire, the wire having another end for connection to a common ground of a power supply, and the actuator having a second terminal for connection to a voltage of the power supply; and a command module having a first terminal for connection to the common ground of the power supply and a second terminal for connection to a third terminal of the actuator. The actuator may incorporate a load having a first terminal connected to the first terminal of the actuator, and a third terminal connected to the third terminal of the actuator; a switch having a first terminal connected to a second terminal of the load, and having a second terminal connected to a second terminal of the actuator; and a power storage module having first and second terminals connected, respectively, to the first and second terminals of the load.

When the command module provides a command voltage for the load, the first and second terminals of the switch may disconnect the second terminal of the load from the second terminal of the actuator, thereby reducing current to the load to zero and thus reducing the voltage drop of the wire to zero.

The power storage device may provide current to the load in lieu of the current previously provided by the power supply to the load.

When the command voltage has been provided to the load, then the first and second terminals of the switch may connect the second terminal of the load to the second terminal of the actuator.

The system may further incorporate a logic module connected between the third terminal of the actuator and the third terminal of the load, and having a connection to disconnect or connect the first and second terminals of the switch to disconnect or connect the second terminal of the load from or to, respectively, the second terminal of the actuator. The load may be a motor. The command voltage may be a modulating DC voltage that is passed on by the logic module to the third terminal of the motor indicating an amount of rotation that motor is to provide.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A compensated actuator circuit comprising:
   a power source;
   an actuator having a first terminal connected, via a first wire having X ohms of resistance, to a common ground terminal of the power source, and having a second terminal connected via a second wire to a voltage terminal of the power source, wherein the actuator comprises:
      a motor having a first terminal connected to the first terminal of the actuator;
      a switch having a first terminal connected to a second terminal of the motor, a second terminal connected to the second terminal of the actuator, and having a third terminal for controlling a closing and opening of the first and the second terminals of the switch;
      a logic module having a first terminal connected to the third terminal of the actuator, a second terminal connected to the third terminal of the switch, a third terminal connected to a third terminal of the motor for controlling the motor, and a fourth terminal connected to the first terminal of the actuator; and a power storage module having first terminal connected to the first terminal of the motor and a second terminal connected to the second terminal of the motor; and a command module having a first terminal connected to the common ground terminal of the power source and having a second terminal connected to a third terminal of the actuator.

2. The circuit of claim 1, wherein the switch is opened or closed according to a signal from the second terminal of the logic module to the third terminal of the switch, to connect or disconnect the second terminal of the motor and the second terminal of the power storage module via the third terminal of the actuator to or from, respectively, the voltage terminal of the power source.

3. The circuit of claim 2, wherein the first terminal of the logic module receives a command voltage, via the third terminal of the actuator and the first and second terminals of the command module, from the common ground terminal, to rotate the motor a certain amount according to a magnitude of the command voltage, relative to the common ground terminal, at the first terminal of the motor.

4. The circuit of claim 3, wherein when the command voltage is to be sent from the second terminal of the command module to the first terminal of the logic module, a signal from the second terminal of the logic module goes to the third terminal of the switch and opens the switch, thereby reducing the current to zero through the first wire having the X ohms of resistance, and then a command voltage is provided to the first terminal of the logic module, and the power storage module provides power from the first and second terminals to the first and second terminals, respectively, of the motor while the switch is open.

5. The circuit of claim 4, wherein upon receipt of the command voltage to the third terminal of the motor that determines the amount of rotation of the motor, the switch is closed with the signal from the second terminal of the logic module to the third terminal of the switch, and current flows from the power source to the first and second terminals of the motor and to the power storage module to replenish lost power.

6. The circuit of claim 5, wherein the wire resistance ranges from 0.001 to 0.1 ohm per foot and the length of the first wire ranges from 0.1 inch to 100 feet.

7. The circuit of claim 5, wherein the command module provides a modulating DC voltage at the second terminal for control of the motor.

8. A method for control of an actuator motor comprising:
connecting a first terminal of a motor to a resistive wire for connection to a common ground terminal of a power supply, wherein the wire has a resistance value which has a voltage drop when current is flowing through the wire to the motor;
connecting a second terminal of the motor via a switch to a voltage terminal of the power supply;
connecting a first terminal of a command module to the common ground terminal;
connecting a second terminal of the command module to a control terminal of the motor;
connecting a power storage module across the first and second terminals of the motor;
connecting a logic module between the command module and the control terminal of the motor;
connecting the logic module to a control terminal of the switch;

opening the switch when a command voltage is provided to the control terminal of the motor; and
closing the switch after the command voltage is provided to the motor.

9. The method of claim 8, wherein:
while the switch is open, the motor continues to be energized with current from the power storage module; and
when the switch is closed, the power storage module is recharged with some current drawn from current going to the motor.

10. The method of claim 8, wherein:
opening the switch stops current flow through the resistive wire and eliminates the voltage drop; and
the command voltage at the control terminal to the motor is unaffected by the voltage drop in the wire.

11. The method of claim 8, wherein:
the logic module is further connected to the first terminal of the motor; and
the logic module can detect an amount voltage drop through the resistive wire.

12. The method of claim 11, wherein if the command module provides a command voltage for the motor, the logic module sends a signal to the control terminal of the switch to open the switch to stop current flow from the power supply and eliminate the voltage drop through the resistive wire, and current continues to flow to the motor from the power storage module.

13. An actuator system comprising:
an actuator having a first terminal connected to one end of a wire, the wire having another end for connection to a common ground of a power supply, and the actuator having a second terminal for connection to a voltage of the power supply; and
a command module having a first terminal for connection to the common ground of the power supply and a second terminal for connection to a third terminal of the actuator; and
wherein the actuator comprises:
a load having a first terminal connected to the first terminal of the actuator, and a third terminal connected to the third terminal of the actuator;
a switch having a first terminal connected to a second terminal of the load, and having a second terminal connected to a second terminal of the actuator;
a power storage module having first and second terminals connected, respectively, to the first and second terminals of the load; and
a logic module connected between the third terminal of the actuator and the third terminal of the load, and having a connection to disconnect or connect the first and second terminals of the switch to disconnect or connect the second terminal of the load from or to, respectively, the second terminal of the actuator.

14. The system of claim 13, wherein when the command module provides a command voltage for the load, the first and second terminals of the switch disconnect the second terminal of the load from the second terminal of the actuator, thereby reducing current to the load to zero and thus reducing the voltage drop of the wire to zero.

15. The system of claim 14, wherein the power storage device provides current to the load in lieu of the current previously provided by the power supply to the load.

16. The system of claim 15, wherein when the command voltage has been provided to the load, then the first and second terminals of the switch connect the second terminal of the load to the second terminal of the actuator.

17. The system of claim 16, wherein:

the load is a motor; and the command voltage is a modulating DC voltage that is passed on by the logic module to the third terminal of the motor indicating an amount of rotation that motor is to provide.

* * * * *